(12) United States Patent
Sinkauz

(10) Patent No.: US 8,783,755 B2
(45) Date of Patent: Jul. 22, 2014

(54) PARTIALLY DISMOUNTABLE HARD SHELL FOR VEHICLES WITH BED

(76) Inventor: Fabio Sinkauz, Monfalcone (IT)

( * ) Notice: Subject to any disclaimer, the term of this patent is extended or adjusted under 35 U.S.C. 154(b) by 0 days.

(21) Appl. No.: 13/981,105

(22) PCT Filed: Feb. 3, 2012

(86) PCT No.: PCT/IT2012/000041
§ 371 (c)(1),
(2), (4) Date: Jul. 23, 2013

(87) PCT Pub. No.: WO2012/104888
PCT Pub. Date: Aug. 9, 2012

(65) Prior Publication Data
US 2013/0300148 A1    Nov. 14, 2013

(30) Foreign Application Priority Data

Feb. 4, 2011    (IT) .............................. GO2011A0002

(51) Int. Cl.
*B60P 7/02*    (2006.01)
(52) U.S. Cl.
USPC ................................ 296/100.03; 296/100.09
(58) Field of Classification Search
USPC ............. 296/100.03, 100.04, 100.06, 100.07, 296/100.09, 100.17
See application file for complete search history.

(56) References Cited

U.S. PATENT DOCUMENTS

| | | | | |
|---|---|---|---|---|
| 2,853,340 | A * | 9/1958 | Hershberger | 296/168 |
| 4,659,136 | A * | 4/1987 | Martin et al. | 296/100.04 |
| 4,799,726 | A * | 1/1989 | Scott | 296/100.09 |
| 4,832,395 | A * | 5/1989 | Lovaas | 296/100.03 |
| 5,203,603 | A * | 4/1993 | Hertzberg et al. | 296/100.03 |
| 6,059,349 | A * | 5/2000 | Doll et al. | 296/100.03 |
| 6,997,502 | B1 * | 2/2006 | Reents | 296/100.03 |
| 2004/0061351 | A1 * | 4/2004 | Angelos | 296/100.08 |
| 2009/0044481 | A1 | 2/2009 | Turek | |
| 2010/0065716 | A1 | 3/2010 | Amend | |
| 2011/0316302 | A1 * | 12/2011 | Lenz, Jr. | 296/100.03 |
| 2012/0235439 | A1 * | 9/2012 | Mazur | 296/100.03 |

FOREIGN PATENT DOCUMENTS

| | | |
|---|---|---|
| CH | 367966 A | 3/1963 |
| DE | 3410484 A1 | 10/1985 |
| WO | 2005061804 A | 7/2005 |

* cited by examiner

*Primary Examiner* — Jason S Morrow

(57) ABSTRACT

The hard shell comprises a fore element (1) and a back element (2) permanently mounted on the bed and a certain number of intermediate elements (3, 4, 5, 6, 7); the fore element (1) and the back element (2) of the shell are made up of rigid frames; to each free end of the girders a moving element is fixed, sliding in a rail (19) fixed to the side edge of the motor vehicle bed; each intermediate element (3, 4, 5, 6, 7) is formed by at least one upper crosspiece (3.1, 4.1, 5.1, 6.1, 7.1) and two girders (3.2, 4.2, 5.2, 6.2, 7.2); each girder (3.2, 4.2, 5.2, 6.2, 7.2) is hinged to the upper crosspieces (3.1, 4.1, 5.1, 6.1, 7.1); each intermediate element (3, 4, 5, 6, 7) is foldable along the hinge plans and the girders (3.2, 4.2, 5.2, 6.2, 7.2) are placed under the upper crosspiece (3.1, 4.1, 5.1, 6.1, 7.1) when the shell is not mounted.

16 Claims, 21 Drawing Sheets

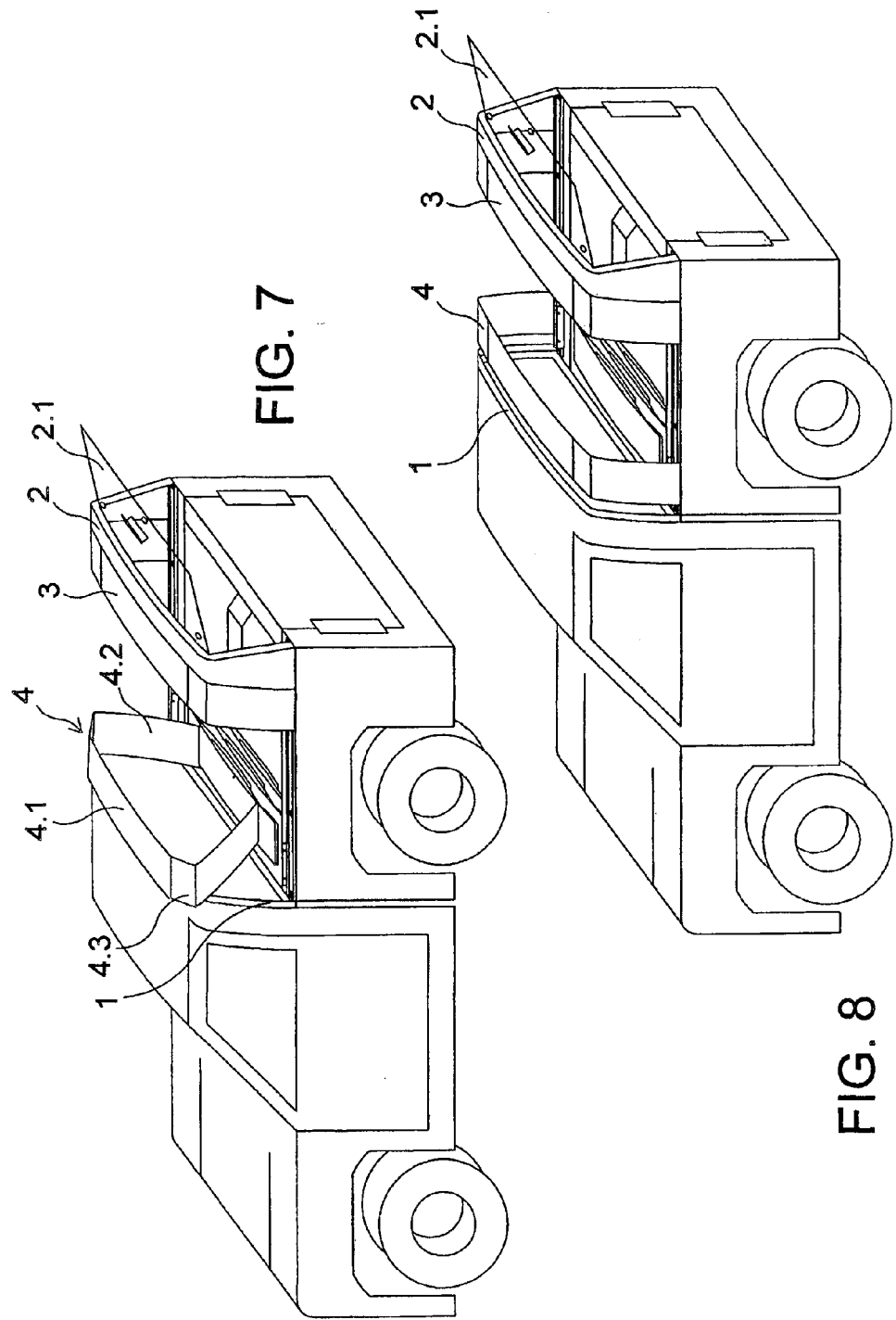

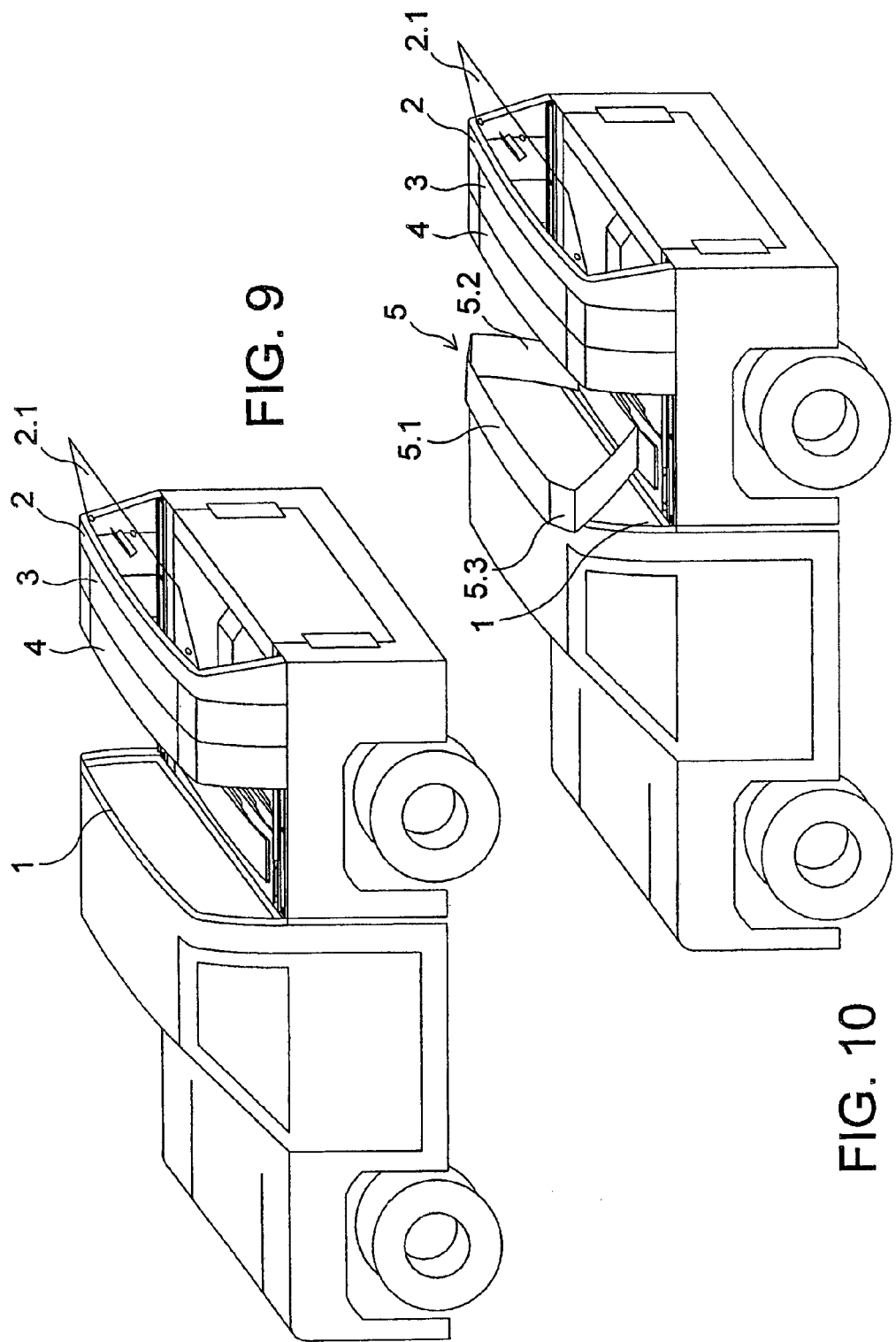

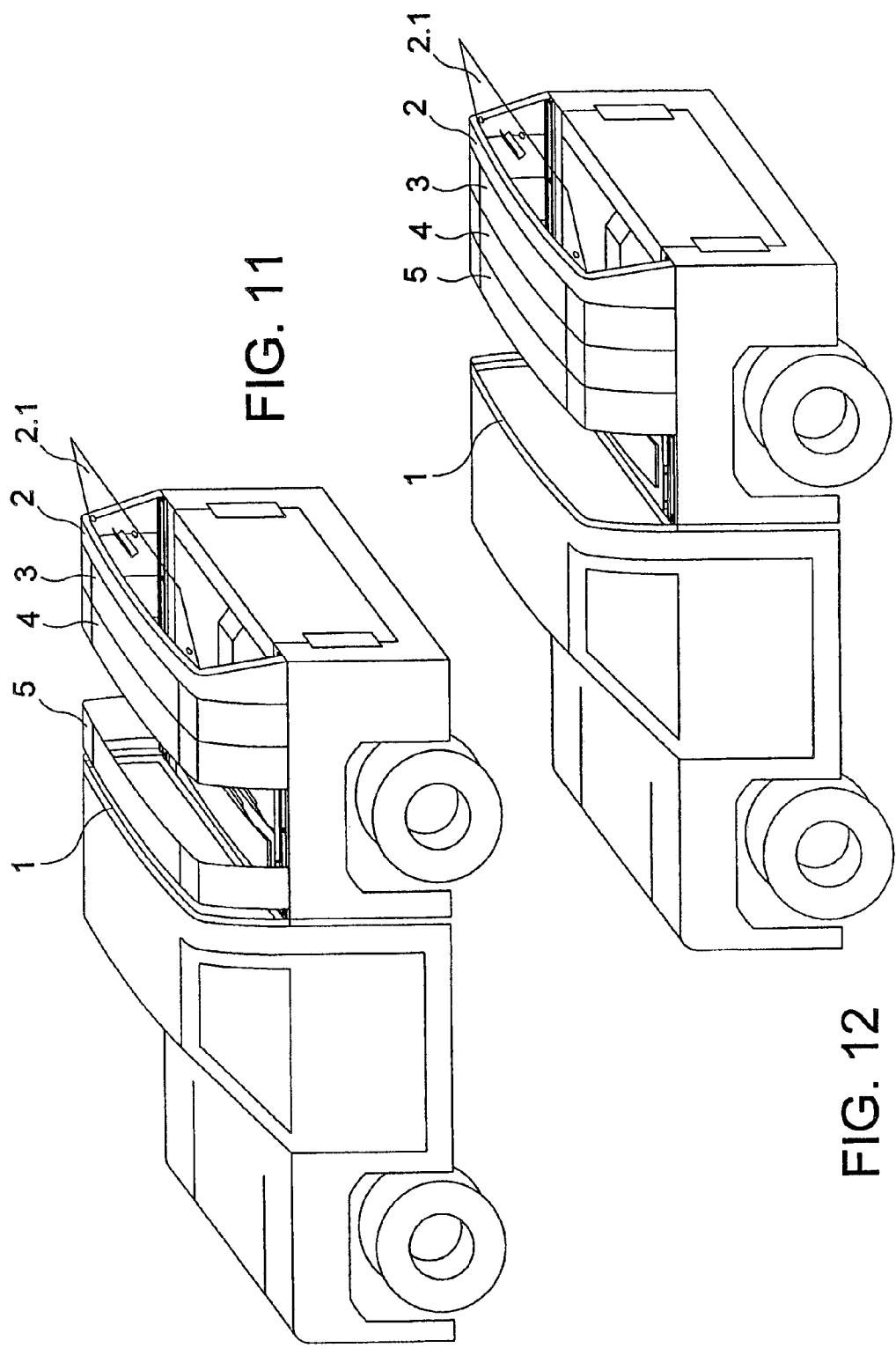

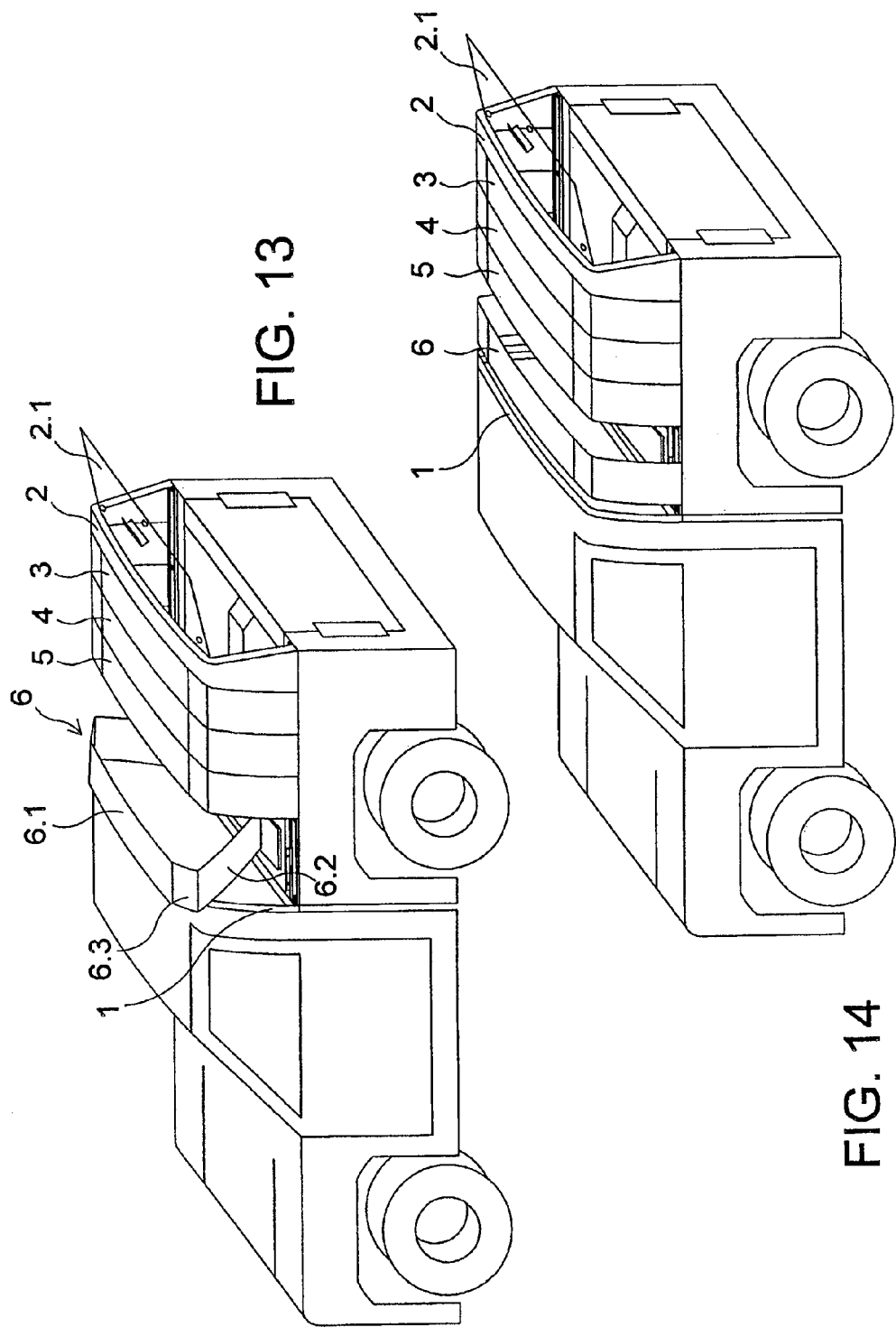

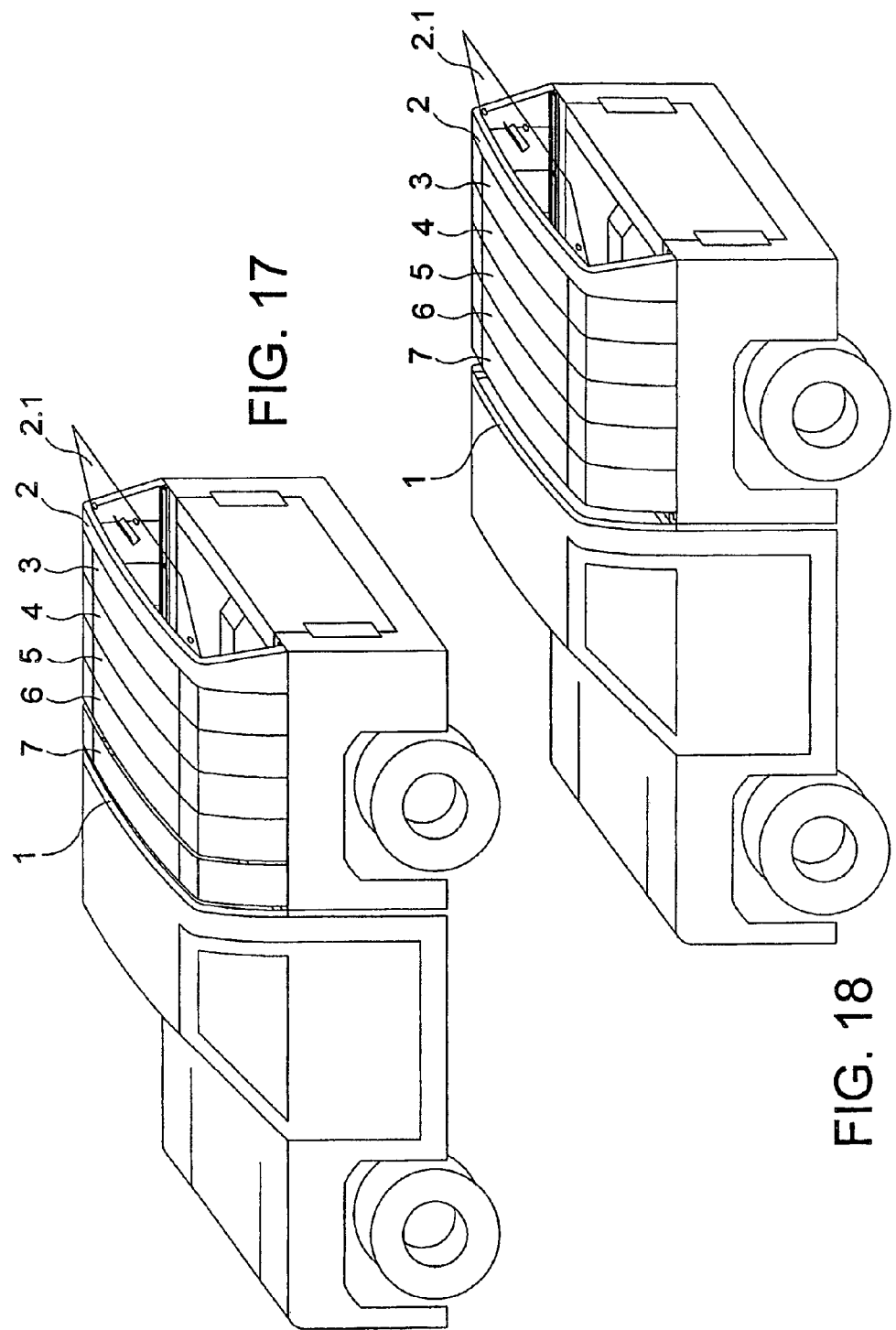

PARTIALLY DISMOUNTABLE HARD SHELL FOR VEHICLES WITH BED

FIELD OF APPLICATION

This invention regards a hard shell for vehicles with bed. The shell is partially dismountable by hand and is always lodged in the bed of the motor vehicle.

BACKGROUND OF THE INVENTION

Unfortunately, hard shells used to close a motor vehicle bed are limited by their maximum inner height available. When, in fact, one needs to transport a cargo with a greater height than the one of the hard shell, the latter must be removed from the motor vehicle.

In order to solve this problem, folding shells have been devised, whose ends slide in rails fixed to the edges of the motor vehicle bed sides. Examples of these folding shells are described in U.S. Pat. No. 4,252,363, in U.S. Pat. No. 4,789,196, in U.S. Pat. No. 5,531,497, in U.S. Pat. No. 6,431,634, in USA Patent Application no. 2004/061351, in U.S. Pat. No. 6,997,502 and in Canadian Patent Application no. 2 638 493.

In particular, U.S. Pat. No. 6,997,502 describes a transformable cover for vehicles with bed, comprising means for detachably attaching said truck bed cover to the open bed, means for adjusting the length of said truck bed cover and a cover assembly detachably attached to said means. Said means for detachably attaching said truck bed cover to said open bed comprise two anchor rails and two cover attachment rails. The means for adjusting the height and the length of the truck bed cover comprise a plurality of support assemblies pivotally and slidably engaged with the anchor rails. Each of the plurality of support assemblies comprises two sled assemblies, two side members, two support cylinders and a third cross member. But these folding shells, being soft, need supports that partially occupy the useful cargo space. Moreover, they do not offer the advantage to last in time and they do not have suitable thermal isolation, mechanical rigidity and protection against acts of vandalism.

SUMMARY OF THE INVENTION

The aim of this invention is to make available to the users a hard shell for vehicles with bed, equipped with intermediate elements that can be removed and folded. This and other targets are reached by the partially dismountable hard shell, which comprises a fore element, a back element, more than three intermediate elements and two rails fixed to the side edges of the vehicle bed.

Both the fore element and the back element of the shell are made up of a rigid frame that surrounds a slab in transparent material. Every frame is formed by an upper crosspiece and two girders. Joint elements and at least a gasket are present on the edges of the fore element turned towards the back part of the vehicle. Joint elements are present on the edges of the back element turned towards the fore part of the vehicle.

Moreover, the fore element of the shell is equipped with devices for hook-up with the remaining elements and the back element of the shell is equipped with elements for anchoring the hook-up devices. As an alternative, the fore element of the shell is equipped with holding elements and the back element of the shell is equipped with devices for hook-up with the remaining elements.

A moving element is fixed to each of the free ends of the girders of both the fore and the back elements of the shell. Every moving element slides in one of the two rails fixed to the side edges of the vehicle bed and preferably to its upper edge.

Such moving element is equipped with gearings in the fore element while it lacks gearings in the back element. Vice versa, each rail lacks gearings in its fore part while is equipped with gearings in its central and back part. Each rail can be formed by two section bars, placed one after the other and coaxial, of which the fore one lacks gearings and the back one is equipped with gearings.

As an alternative, the moving element present at the end of each girder lacks gearings in the fore element and is equipped with gearings in the back element. In this case, the fore section bar of each rail is equipped with gearings while the back section bar lacks gearings.

Every intermediate element is formed by at least three parts: an upper crosspiece and two girders, equipped or not with openings closed by slabs in transparent material. The upper crosspiece is connected to the girders by means of hinges. Between each girder and the upper crosspiece at least an elastic element and a gasket are present. At least one connection part can be present between each girder and the upper crosspiece of each intermediate element. Each connection part is connected to the upper crosspiece by means of hinges. At least an elastic element and a gasket are interposed between each connection part and the upper crosspiece.

In the same way, each connection part is connected to a girder by means of hinges. At least an elastic element and a gasket are interposed between each connection part and a girder.

The intermediate elements are equipped with joint elements both on the edges turned towards the back part of the vehicle and on the edges turned towards the fore part of the vehicle. The intermediate elements are also equipped with a gasket on the edges turned towards the back part of the vehicle.

The intermediate element next to the fore element is further equipped with holding elements for the hook-up devices of the fore element or with hook-up devices for the holding elements on the fore element. As an alternative, the intermediate element next to the back element is further equipped with holding elements for the hook-up devices of the back element or with hook-up devices for the holding elements on the back element.

To each free end of the girders of the intermediate elements a moving element is fixed, sliding in one of the two rails fixed to the side edges of the vehicle bed. Such moving element has no gearings.

A plaque is fixed in the fore part of each rail. Each plaque is equipped with threaded holes crossed by screws.

The fore element and the back element are permanently mounted on the bed. Each intermediate element is foldable along the hinged plans and its girders and its connection parts are placed under the upper crosspiece when the shell is not mounted. All intermediate elements, so folded, can be lodged in a container placed on the bed of the motor vehicle, separated with spacers in expandable polystyrene or in granules. When the shell is mounted, the intermediate elements are self-supporting. Considering that the intermediate elements can be dismountable and folded, it is possible to mount the hard shell only when possible and necessary. Vice versa, when one needs to transport a cargo with a greater height compared to that of the shell, the intermediate elements are removed and folded (even though remaining on the vehicle), allowing maximum versatility of use of the shell.

BRIEF DESCRIPTION OF THE DRAWINGS

The object of this patent is completely clarified in all its relevant characteristics by the description of a particular way of execution, preferred but not exclusive, of the partially dismountable hard shell, illustrated as an example and with no limitations in the drawings enclosed, in which:

FIGS. 2, 3, 4, 5, 6, 7, 8, 9, 10, 11, 12, 13, 14, 15, 16, 17, 18 show the various stages of assembly of the shell on the motor vehicle bed;

DETAILED DESCRIPTION OF THE INVENTION

Figure 1:
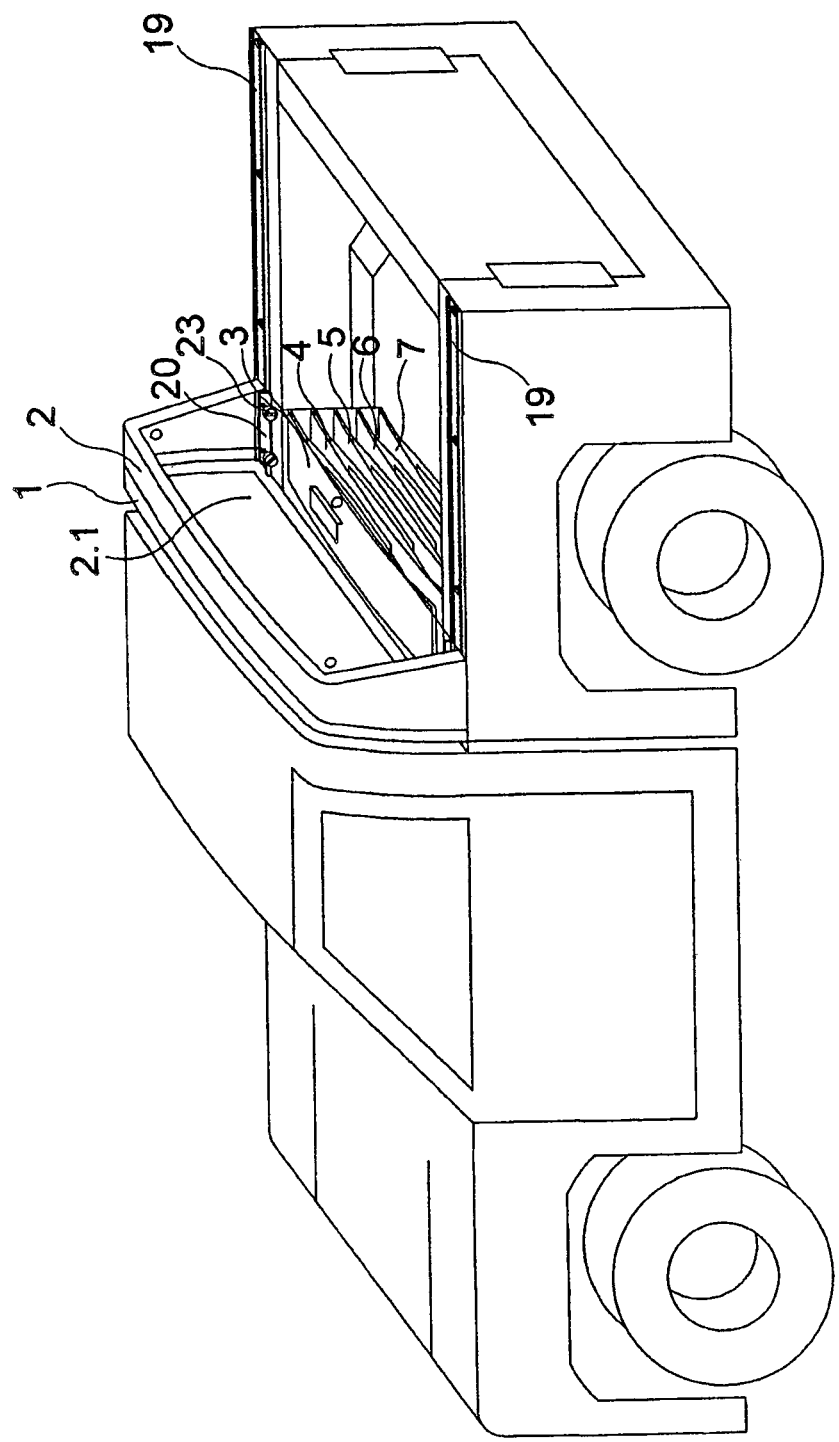
FIG. 1 shows the assembly of the shell on the motor vehicle bed before the assembly.
Figure 2:
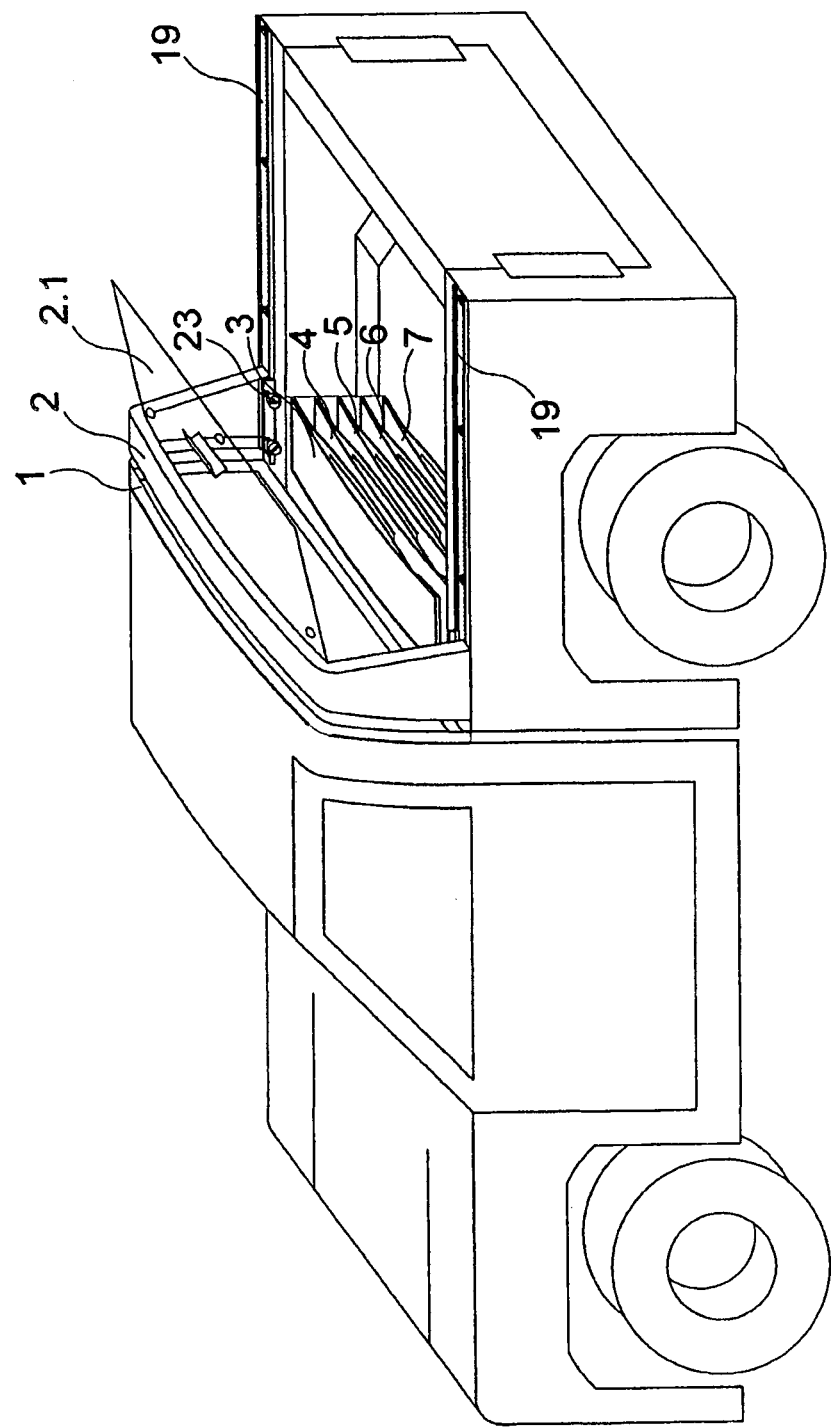
Figure 3:
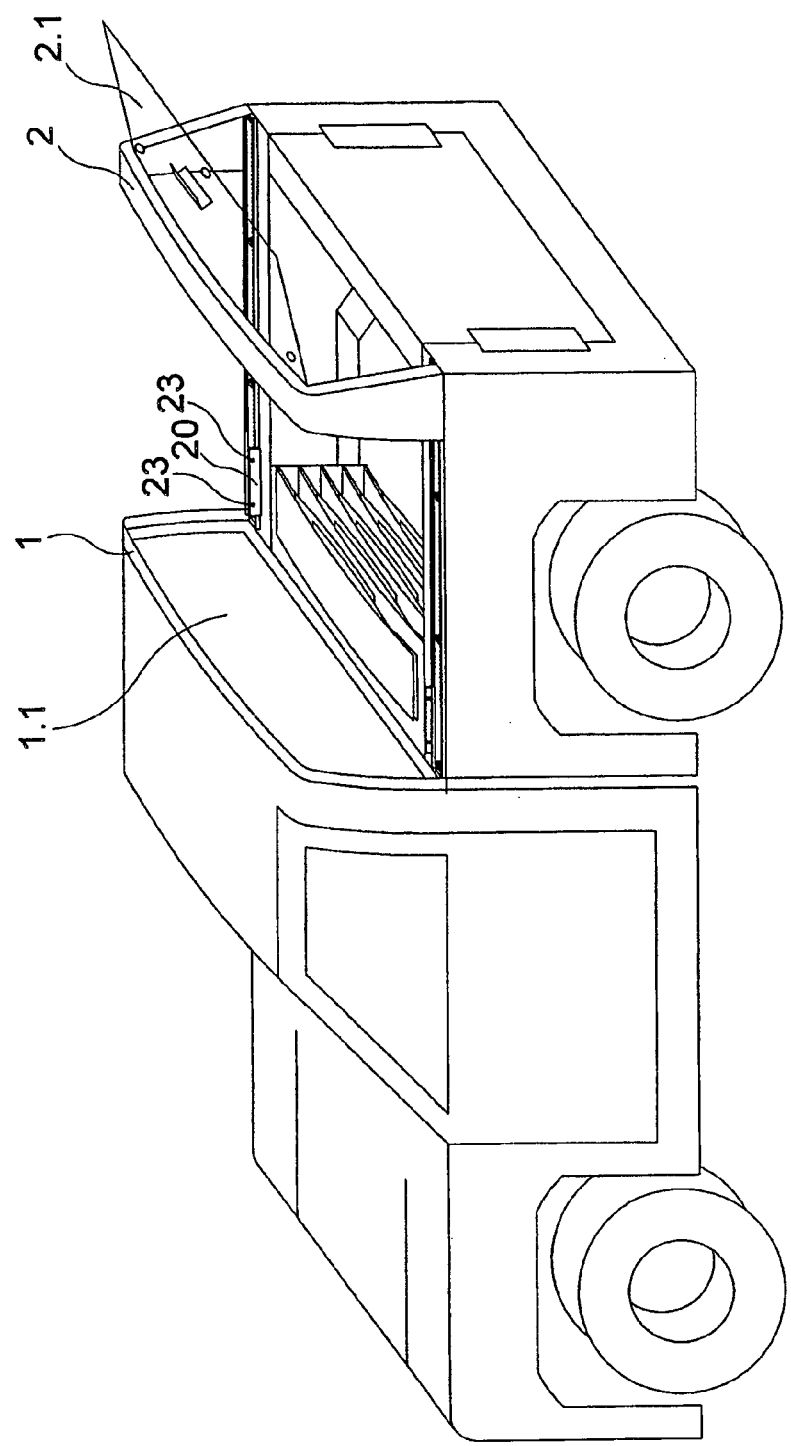
Figure 4:
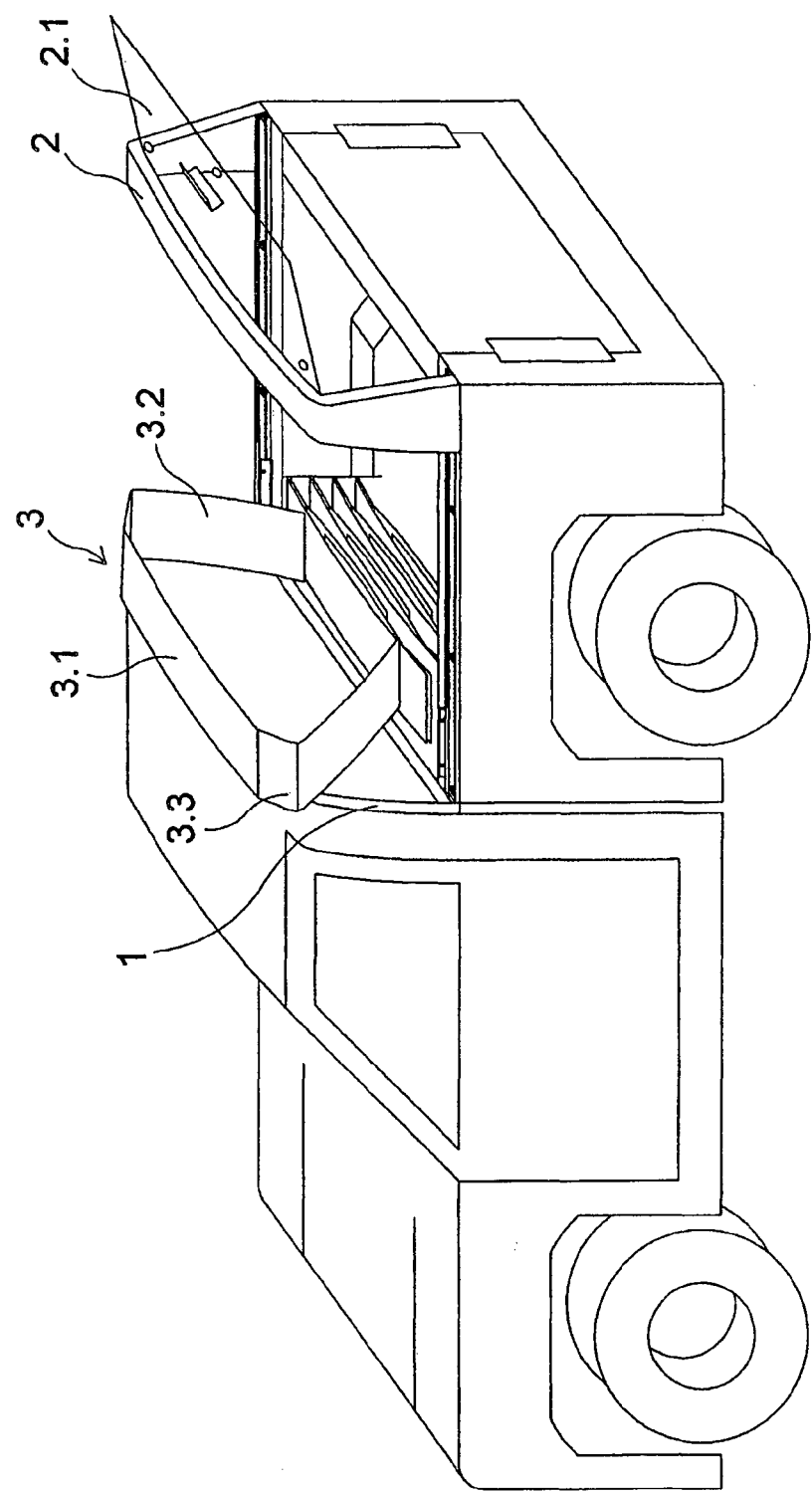
Figure 5:
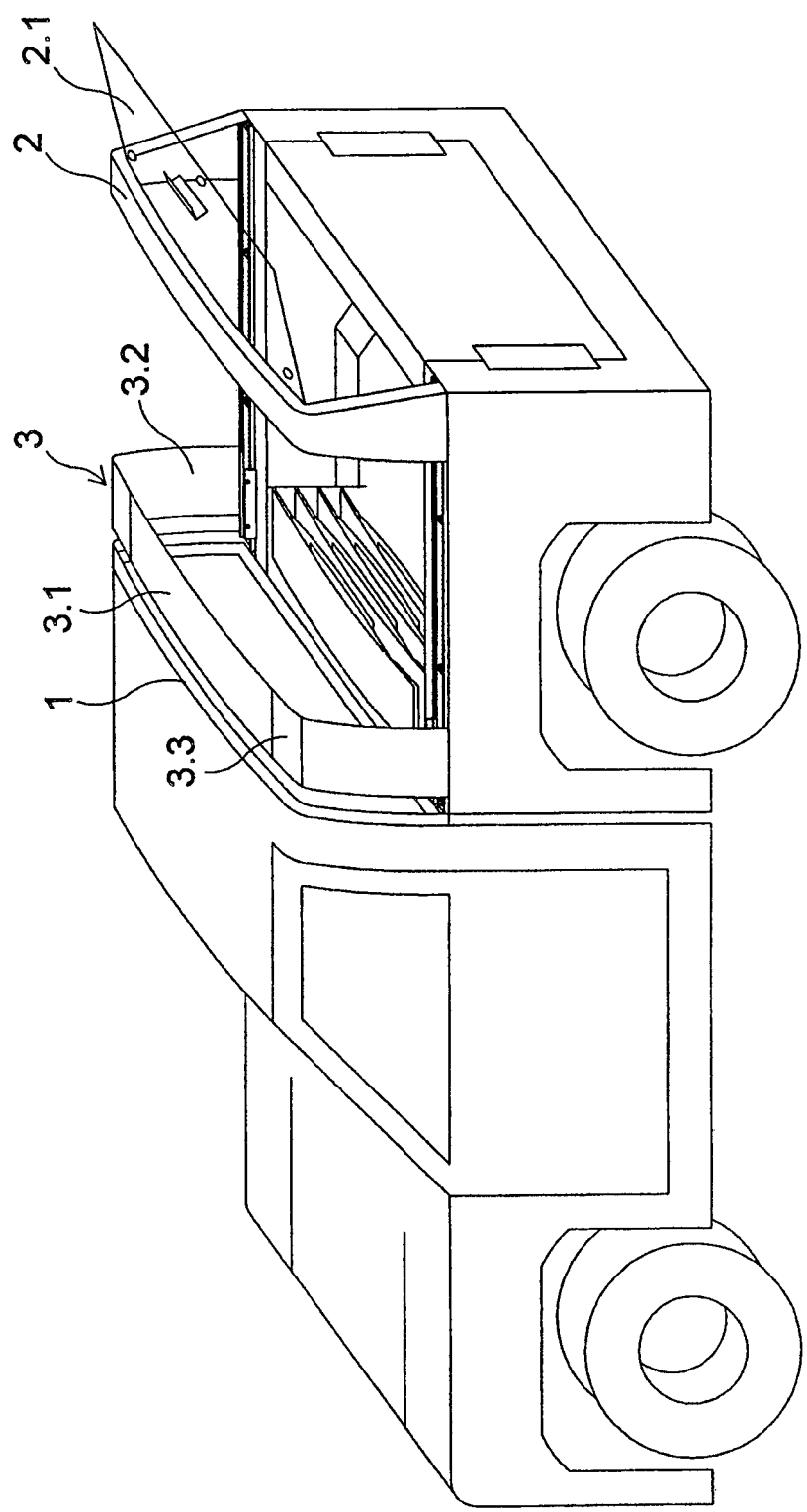
Figure 6:
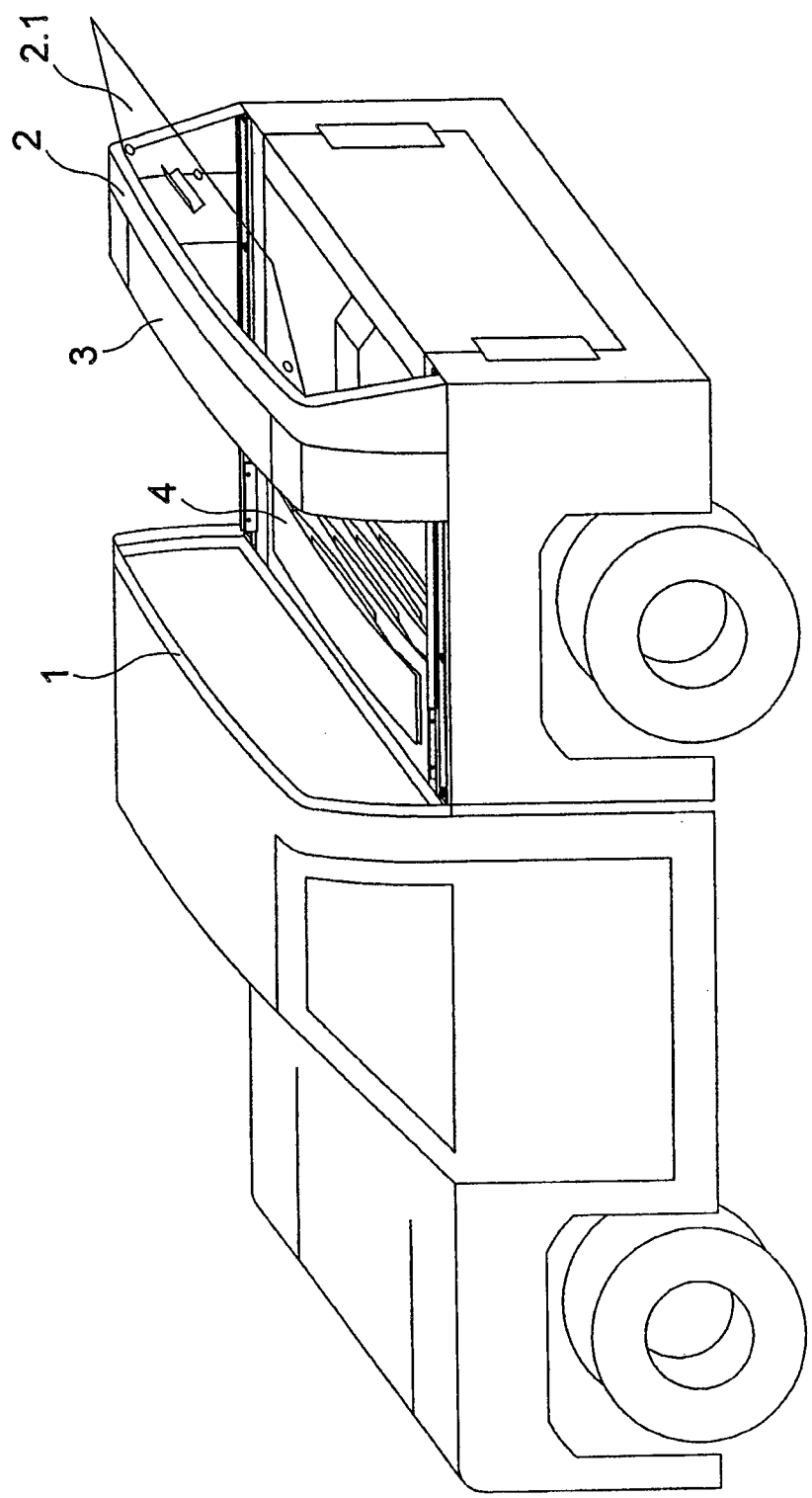
Figure 15:
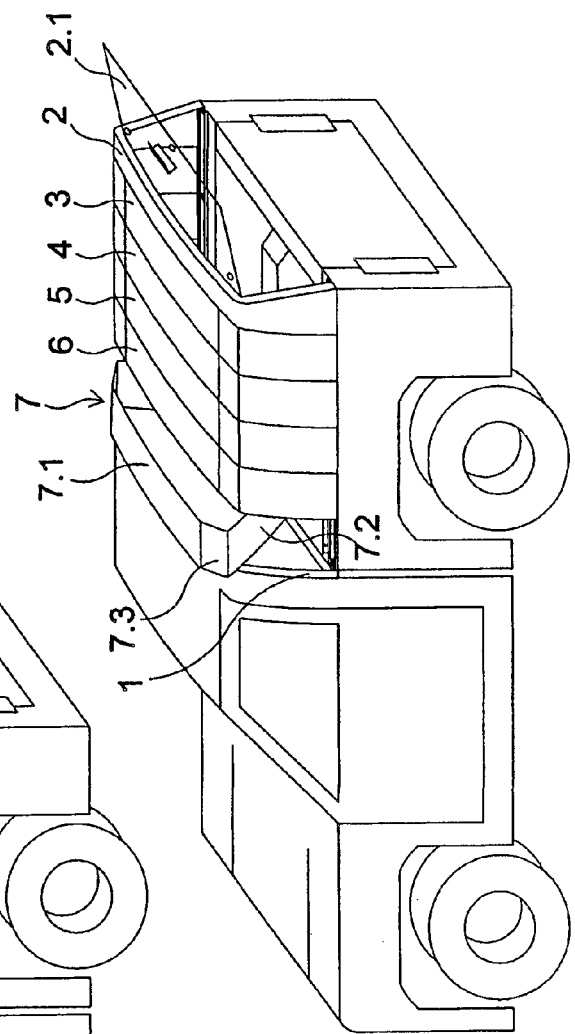
Figure 16:
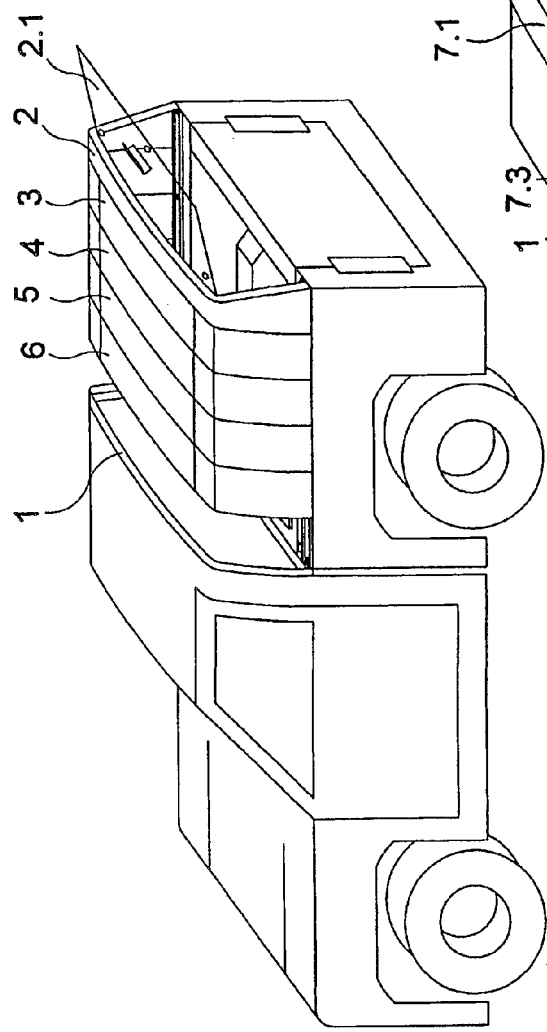
Figure 19:
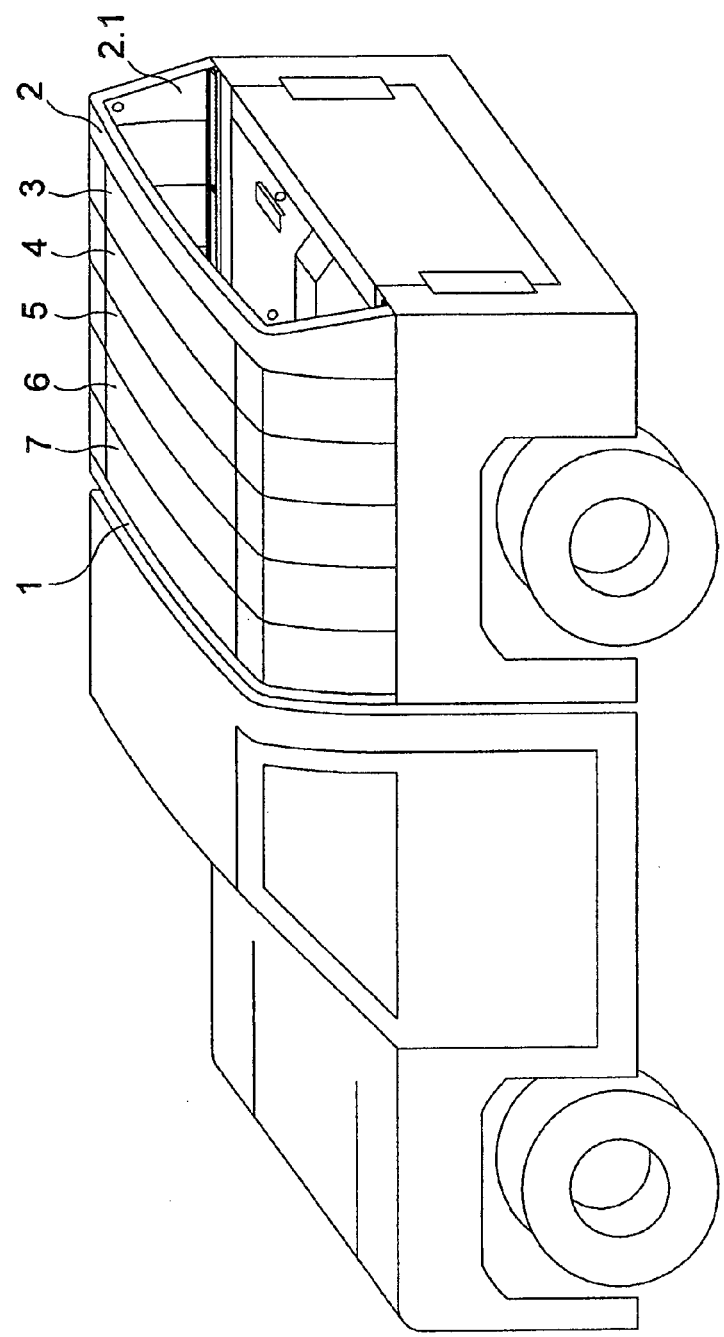
FIG. 19 shows the shell on the motor vehicle bed, completely mounted.
Figure 20:
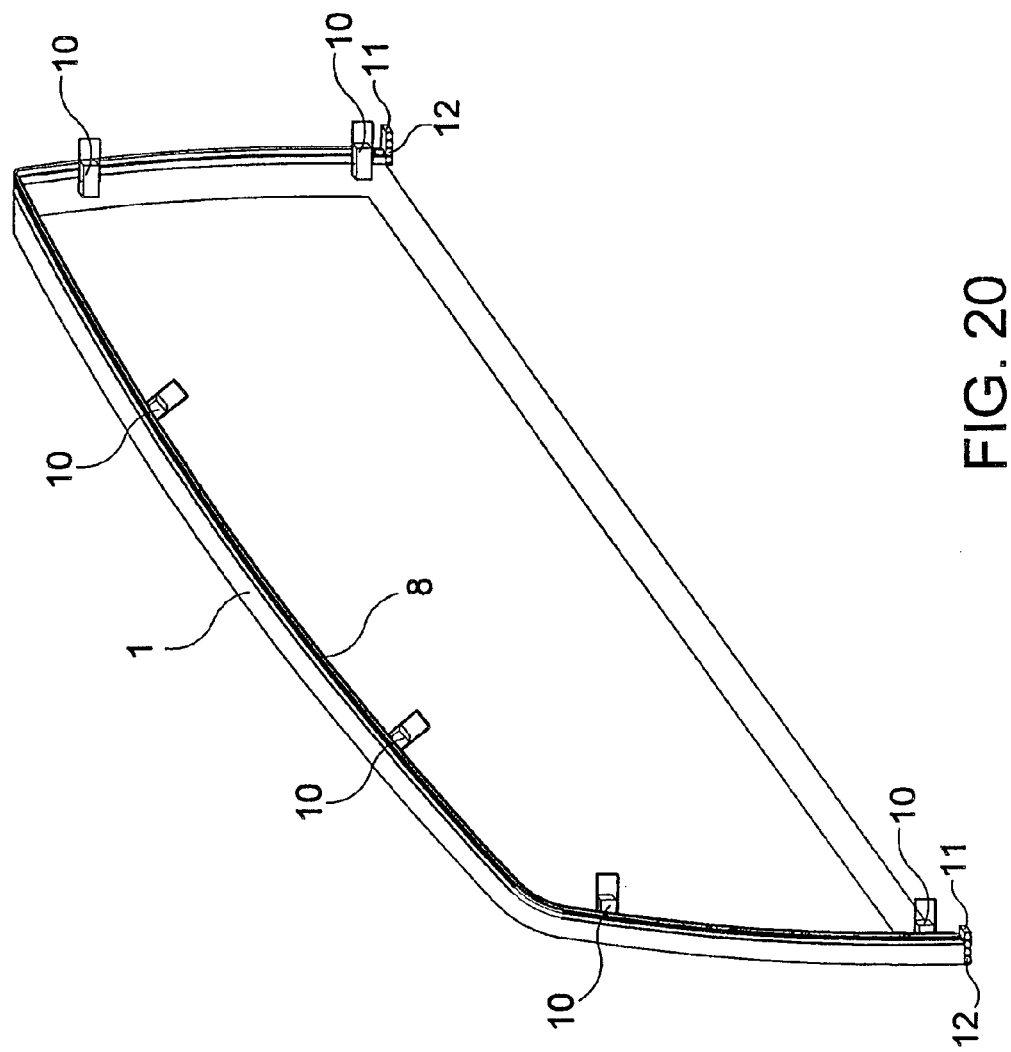
FIG. 20 shows a perspective of the fore element of the shell.
Figure 21:
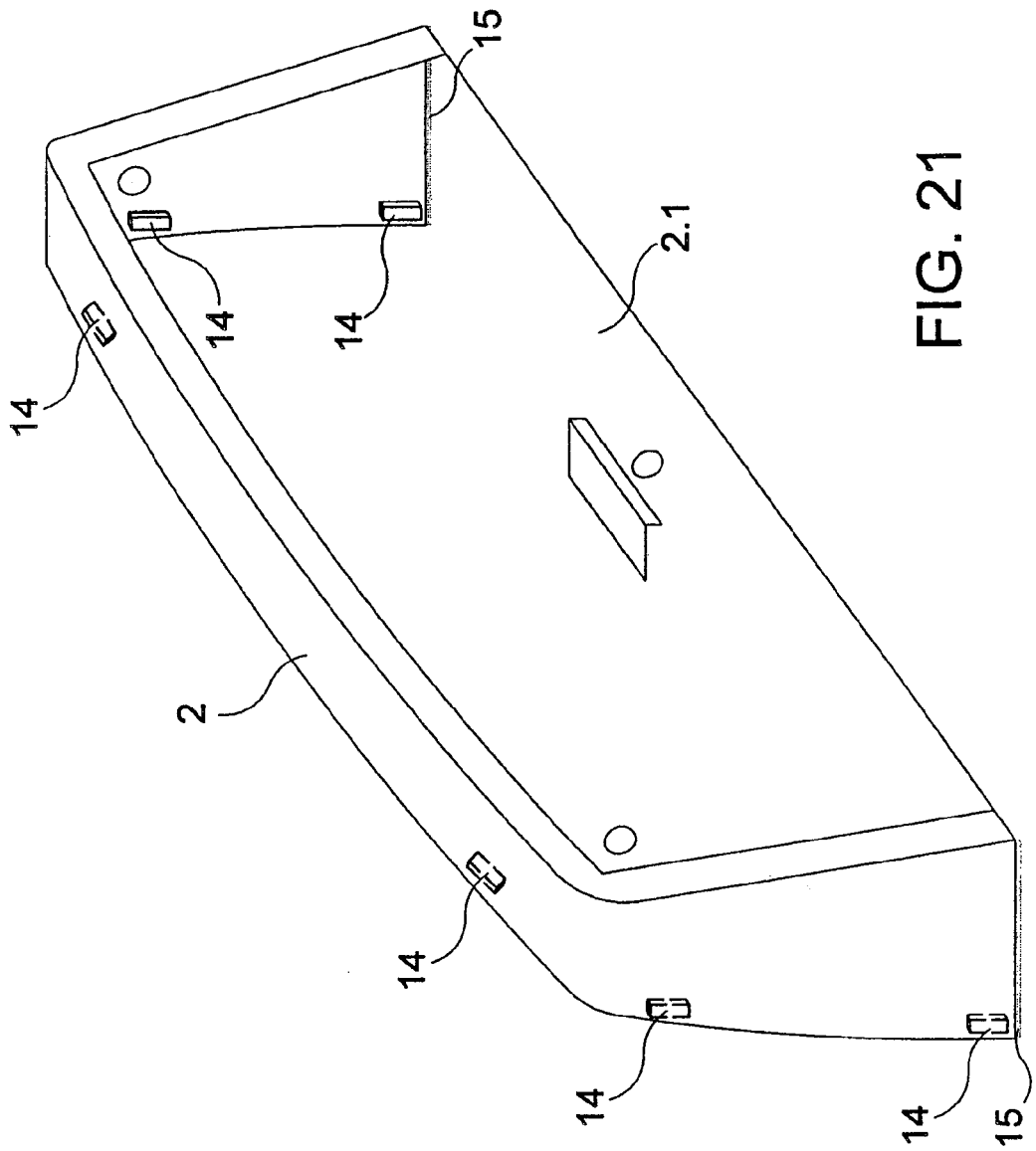
FIG. 21 shows a perspective of the back element of the shell.
Figure 22:
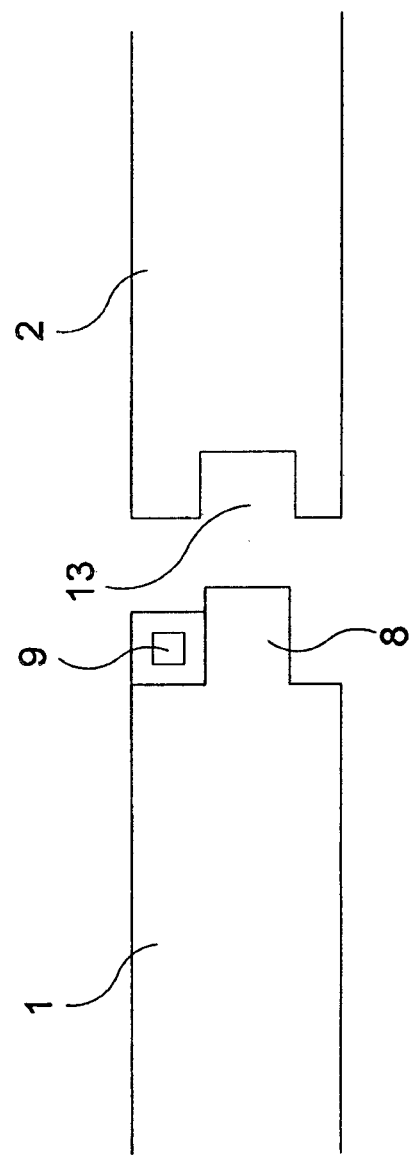
FIG. 22 shows a detail of the connection elements between the elements of the shell.
Figure 23:
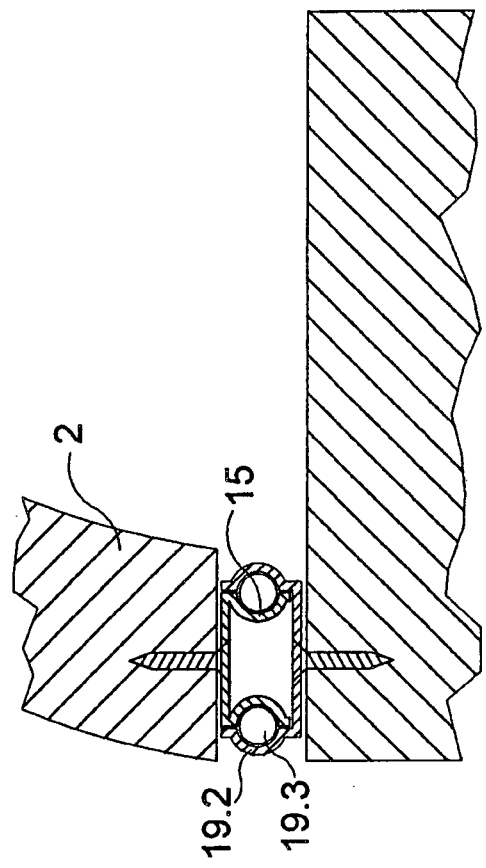
FIG. 23 shows a cross-section of the connection elements between the back element of the shell and the frame of the motor vehicle bed.
Figure 24:
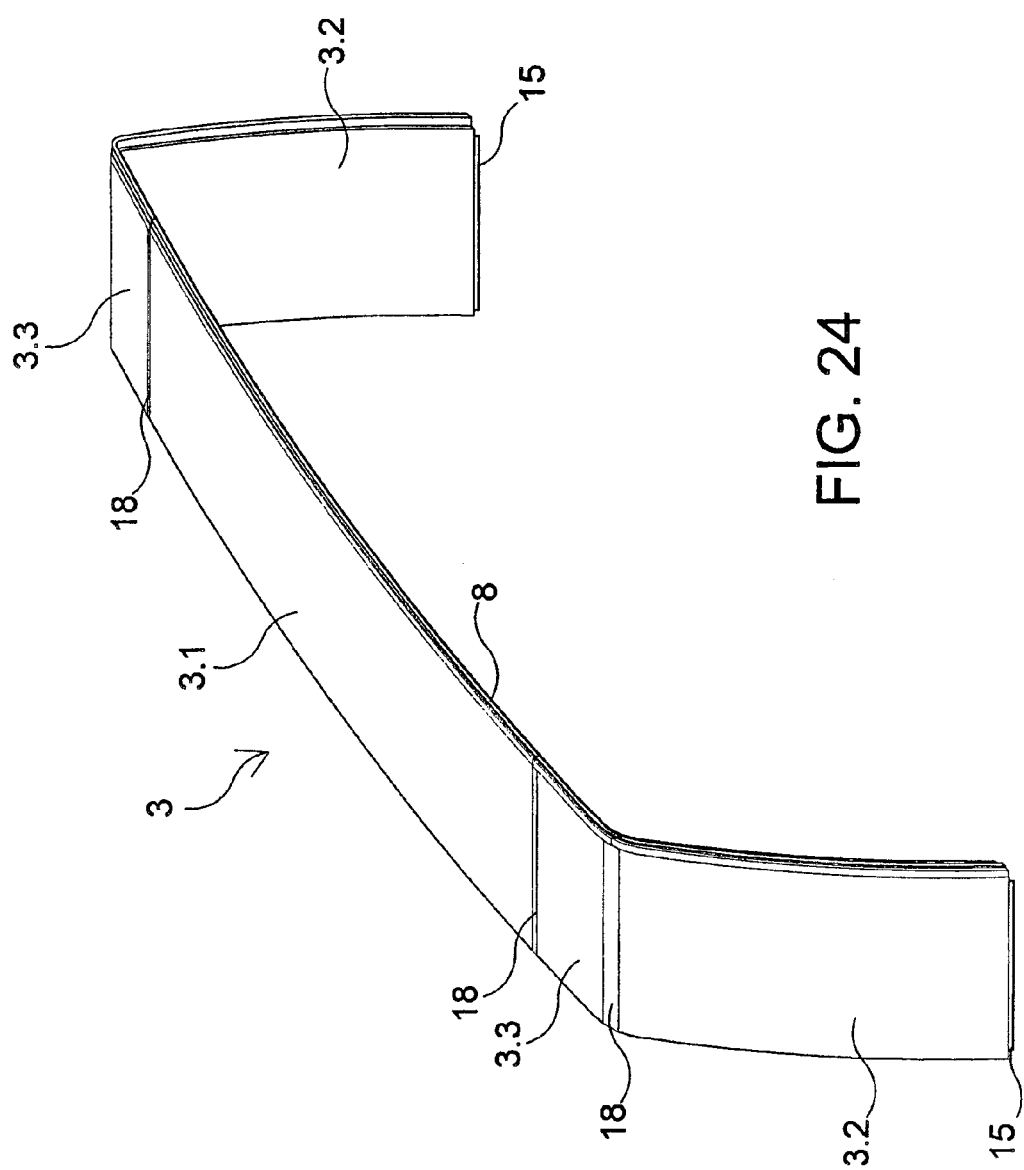
FIG. 24 shows a perspective of one of the five intermediate elements of the shell in open position.
Figure 25:
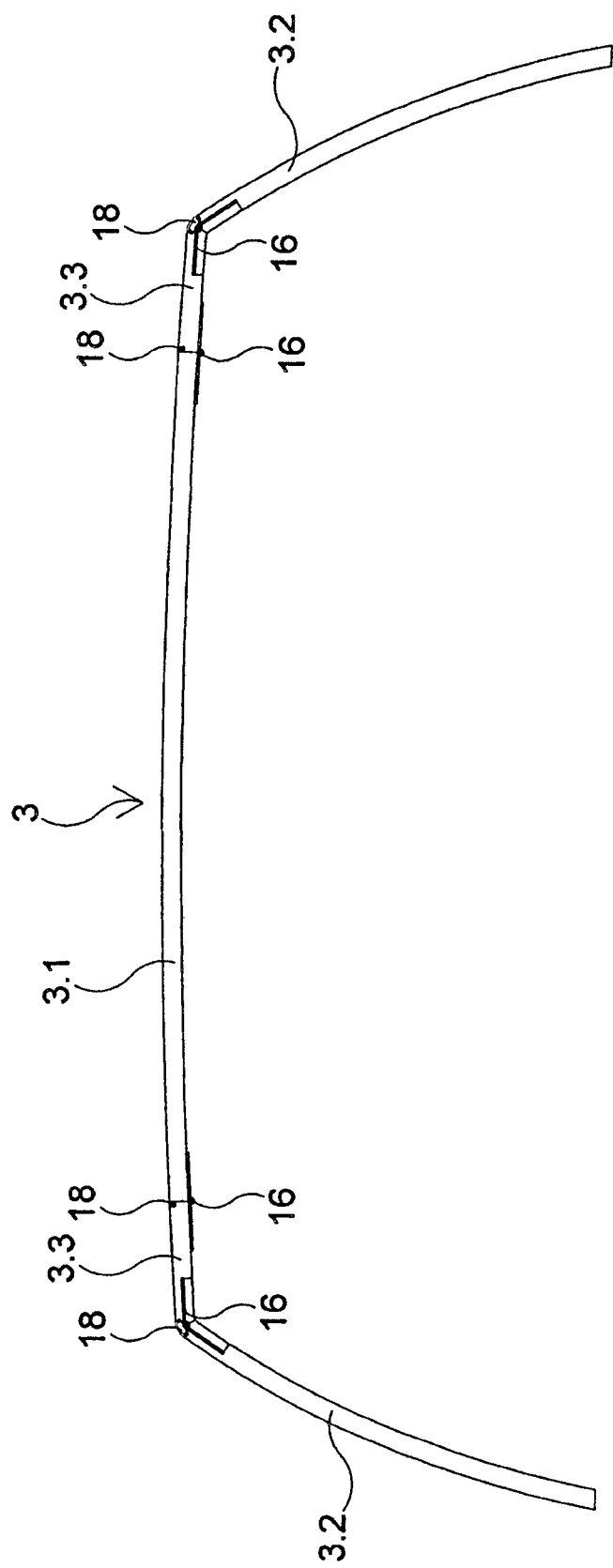
FIG. 25 shows a front view of the same intermediate element.
Figure 26:
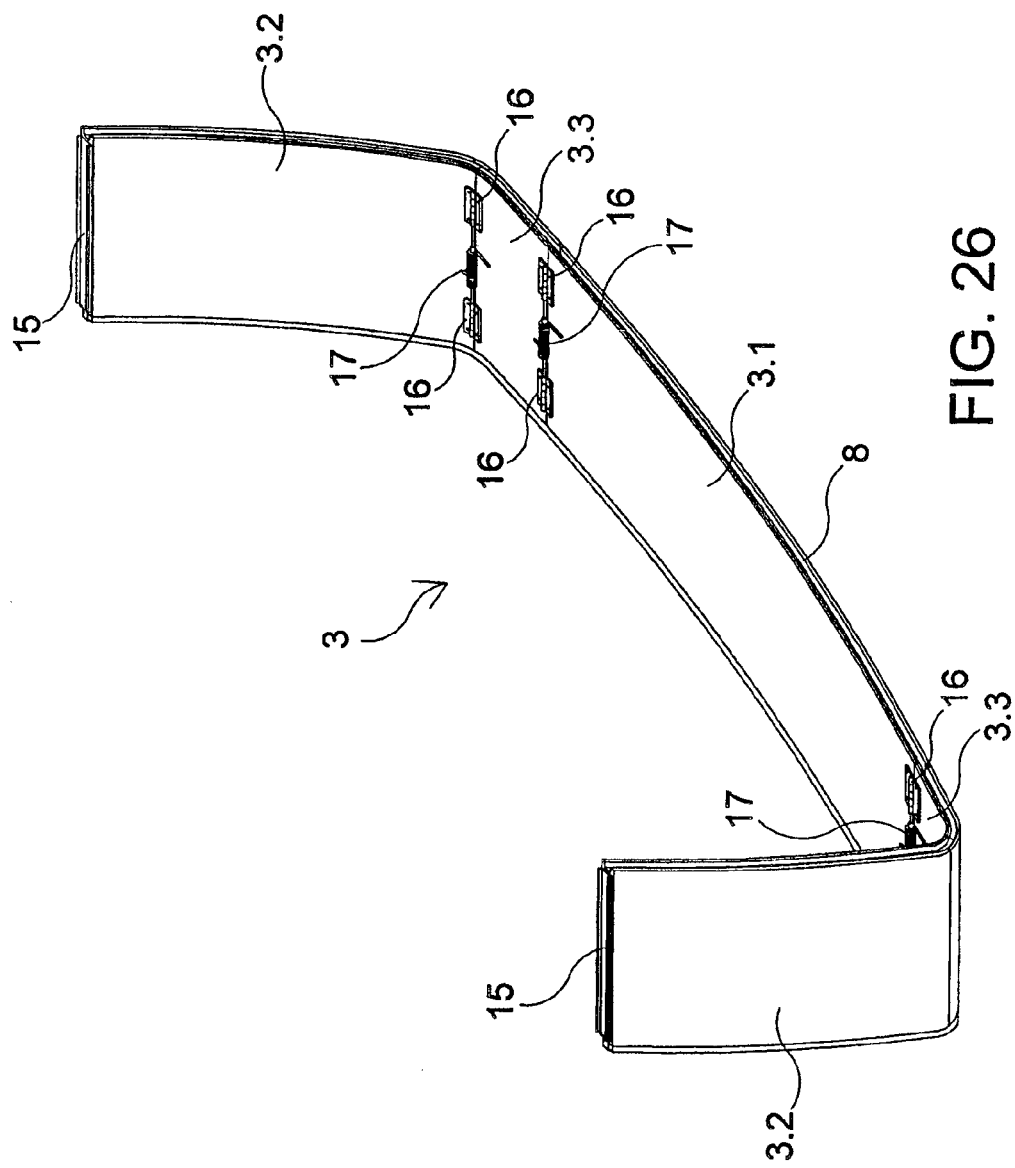
FIG. 26 shows a perspective of the same intermediate element in open and inverted position.
Figure 27:
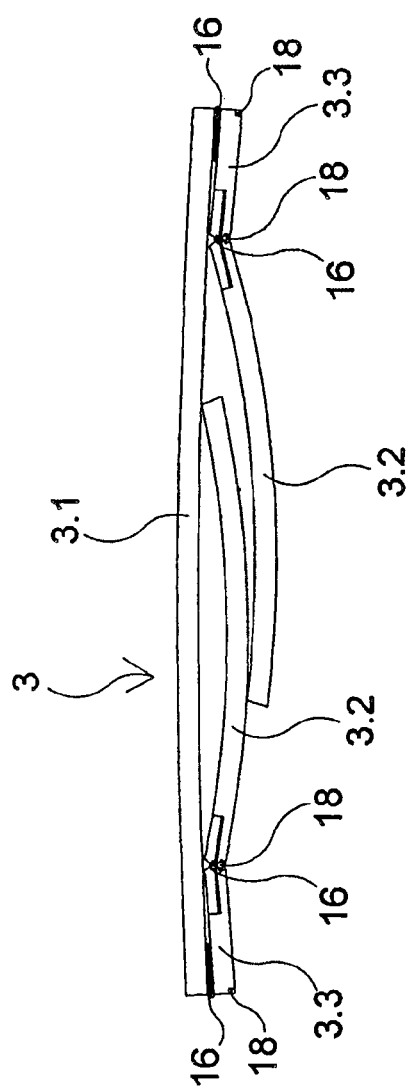
FIG. 27 shows a front view of the same intermediate element in folded position.
Figure 28:
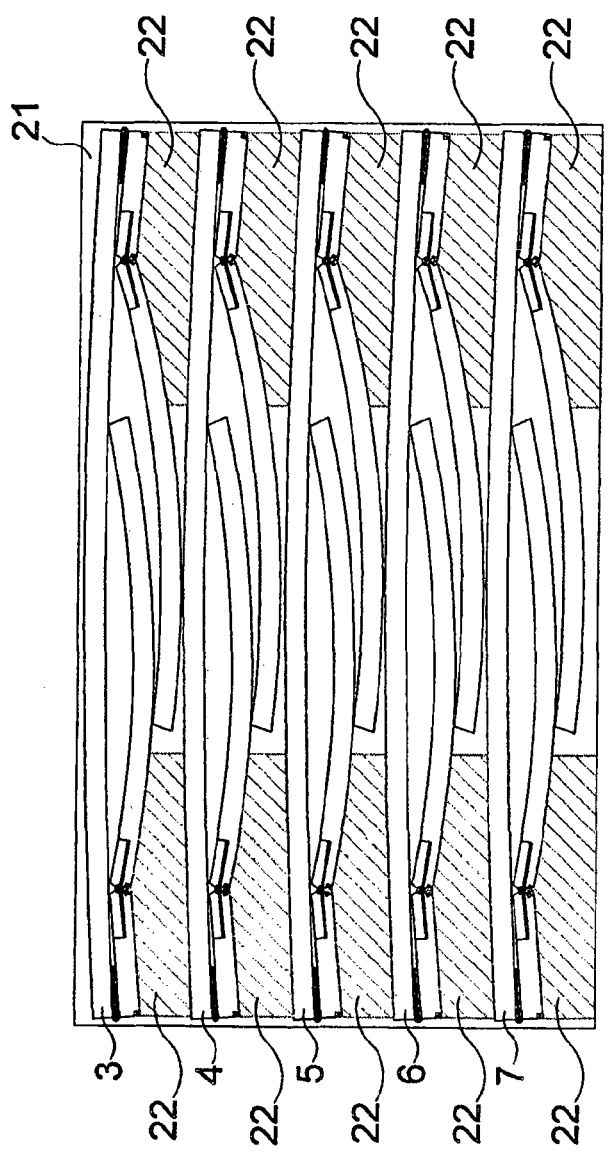
FIG. 28 shows a front view of all intermediate elements of the shell in folded position.

The partially dismountable hard shell for vehicles with bed, preferably built in fibreglass, comprises a fore element 1, a back element 2 and five intermediate elements 3, 4, 5, 6, 7.

The fore element 1 of the shell is made up of a rigid frame surrounding a glass slab 1.1. The frame is formed by an upper crosspiece and by two girders and is equipped with a projecting rectilinear element 8 on the edges turned towards the back part of the vehicle and with a gasket 9. The upper crosspiece and the girders of the fore element 1 are also equipped with hooks 10, each one formed by a tensioning element and by a properly said hook. To each free end of the girders a plaque 11 is fixed, with metallic spheres 12 along two opposite edges.

The back element 2 of the shell is made up of a rigid frame surrounding a glass slab 2.1. The frame is formed by an upper crosspiece and two girders. The upper crosspiece and the girders are equipped with grooves 13 along the edges turned towards the fore part of the vehicle. The upper crosspiece and the girders of the back element 2 are also equipped with lodgings 14.

A section bar 15, shaped as an inverted U, is fixed to each free end of the frame girders of the back element 2. The side arms of such section bar 15 are convex.

Each intermediate element 3, 4, 5, 6, 7 is made up of five parts: an upper crosspiece 3.1, 4.1, 5.1, 6.1, 7.1, two girders 3.2, 4.2, 5.2, 6.2, 7.2 and two connection parts 3.3, 4.3, 5.3, 6.3, 7.3. Each connection part 3.3, 4.3, 5.3, 6.3, 7.3 is hinged to the upper crosspiece 3.1, 4.1, 5.1, 6.1, 7.1 by means of two hinges 16 between which there is a spring 17. Likewise, each connection part 3.3, 4.3, 5.3, 6.3, 7.3 is hinged to a girder 3.2, 4.2, 5.2, 6.2, 7.2 by means of two hinges 16 between which there is a spring 17. Water tightness of the joints is guaranteed by rubber gaskets 18 placed between each connection part 3.3, 4.3, 5.3, 6.3, 7.3 and the upper crosspiece 3.1, 4.1, 5.1, 6.1, 7.1 and between each connection part 3.3, 4.3, 5.3, 6.3, 7.3 and a girder 3.2, 4.2, 5.2, 6.2, 7.2.

The intermediate elements 3, 4, 5, 6, 7 are equipped with projecting rectilinear elements 8, with a gasket 9 on the edges turned towards the back part of the vehicle and with grooves along the edges turned towards the fore part of the vehicle. The intermediate element 7 next to the fore element 1 is also equipped with lodgings 14. To each free end of the girders 3.2, 4.2, 5.2, 6.2, 7.2 of the intermediate elements 3, 4, 5, 6, 7, a section bar 15 is fixed, shaped as an inverted U, with convex side arms and lacking gearings.

Figure 29:
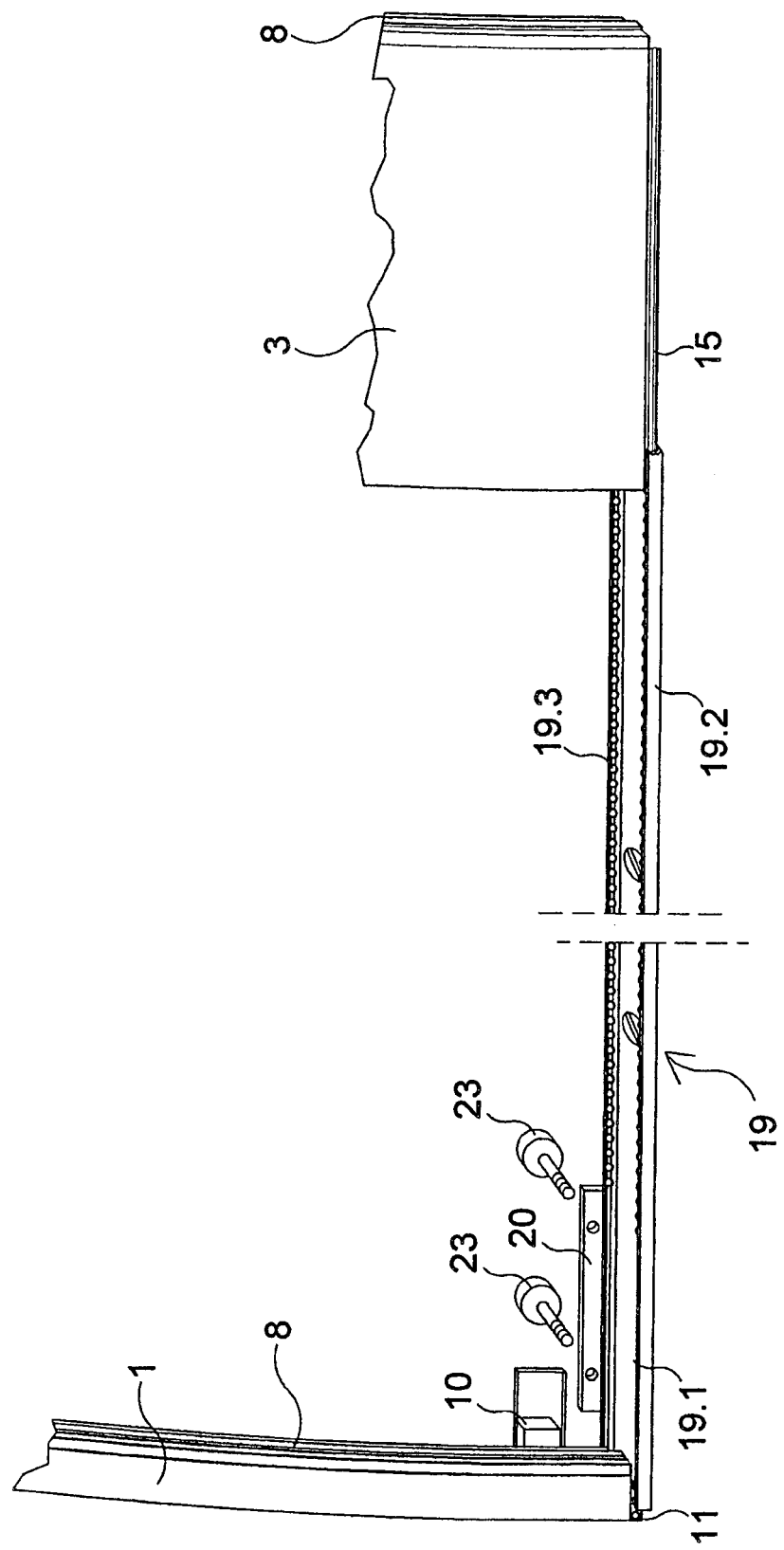
FIG. 29 shows a perspective view of a rail on which the elements of the shell slide.

As shown in FIG. 29, the fore element 1, the back element 2 and the intermediate elements 3, 4, 5, 6, 7 slide on two rails 19 fixed to the upper edges of the sides of the motor vehicle bed.

Each rail 19 is formed by two U-shaped section bars 19.1, 19.2, placed one after the other and coaxial. Each first section bar 19.1, placed towards the fore part of the vehicle, has no gearings. On each first section bar 19.1 a plaque 20 is fixed, equipped with threaded holes. The second section bar 19.2, which occupies the central part and the back part of the vehicle, is equipped with metallic spheres 19.3 along the side arms.

As shown in FIG. 1, when the shell is not used, the back element 2 is blocked on the first section bars 19.1 thanks to screws 23. These, after crossing the threaded holes of the plaques 20, press on the girders of the back element 2 avoiding a possible longitudinal sliding. The fore element 1 is close to the cabin of the vehicle and is fixed to the back element 2 thanks to the hooks 10, whose properly said hooks engage in the lodgings 14 of the back element 2.

Every intermediate element 3, 4, 5, 6, 7 is folded on itself. The presence of the hinges 16 between each connection part 3.3, 4.3, 5.3, 6.3, 7.3, the upper crosspiece 3.1, 4.1, 5.1, 6.1, 7.1 and the girders 3.2, 4.2, 5.2, 6.2, 7.2 allows indeed to rotate the connection parts 3.3, 4.3, 5.3, 6.3, 7.3 and the girders 3.2, 4.2, 5.2, 6.2, 7.2 with respect to the upper crosspiece 3.1, 4.1, 5.1, 6.1, 7.1 until positioning them under and as near as possible to the upper crosspiece 3.1, 4.1, 5.1, 6.1, 7.1.

All intermediate elements 3, 4, 5, 6, 7, so folded, are lodged in a container 21, placed on the bed of the motor vehicle. Intermediate elements are separated by spacers 22 in expandable polystyrene, which are inserted to avoid damaging due to movements and vibrations of the vehicle in motion.

FIGS. 2-18 show the assembly of the hard shell on the bed of the motor vehicle. At the moment of using the shell, the glass slab 2.1 of the frame of the rigid back element 2 is initially lifted up. It is therefore possible to approach the hooks 10 of the fore element 1 and, acting on the tensioning elements, free the properly said hooks of the fore element 1 from the lodgings 14 of the back element 2.

Moreover, the screws 23 that find lodging in the threaded holes are unscrewed from the plaques 20 of each first section bar 19.1, freeing the back element 2 from the first section bars 19.1.

The back element 2 can therefore be removed from the fore element 1 and made slide towards the back end of the bed thanks to the section bars 15 placed at the free ends of its girders that slide in the rails 19. The side arms of the section bars 15, convex, slide on the metallic spheres 19.3 of the second section bars 19.2.

At this point, the first intermediate element 3 is manually extracted from the container 21, which automatically opens up thanks to the springs 17 it is equipped with. The section bars 15, shaped as inverted Us and fixed to the free ends of the girders 3.2, are inserted in the first section bars 19.1 of the rails 19. The insertion of the section bars 15 in the first section bars 19.1 of the rails 19 is allowed by the fact that the first section bars 19.1 have no metallic spheres.

The first intermediate element 3 is then made slide on the second section bars 19.2 of the rails 19 until it joins the back element 2. The projecting rectilinear elements 8 on the edges turned towards the back part of the vehicle of the first intermediate element 3 are inserted in the grooves 13 along the edges turned towards the fore part of the vehicle of the back element 2. The gasket 9 of the first intermediate element 3 interposes between the first intermediate element 3 and the back element 2 guaranteeing water tightness in case of rain.

Assembly of the following intermediate elements 4, 5, 6, 7 is carried out in the same way. Therefore, the fore element 1 is made slide towards the back part of the vehicle until touching the fifth intermediate element 7. The movement is made possible by the plaques 11 equipped with metallic spheres 12, fixed to the free ends of the girders of the fore element 1, which slide within the first section bars 19.1 of the rails 19.

Then the fore element 1 is blocked on the intermediate element 7 next to the fore element 1 thanks to the hooks 10 of the fore element 1, whose properly said hooks engage in the lodgings 14 of the intermediate element 7 next to the fore element 1. Finally, screws 23 are screwed in the threaded holes of the plaques 20 of each first section bar 19.1, which press on the girders of the intermediate element 7 next to the fore element 1, therefore blocking the intermediate element 7 next to the fore element 1 on the first section bars 19.1 and avoiding a possible longitudinal sliding.

The invention claimed is:

1. Partially dismountable hard shell for vehicles with bed, comprising:
    a fore element adapted to be permanently mounted to a vehicle bed;
    a back element adapted to be permanently mounted to a vehicle bed;
    more than three intermediate elements detachable from a vehicle bed and foldable; and
    two rails adapted to be fixed to the side edges of a vehicle bed;
    wherein the fore element of the shell is a rigid frame, formed by an upper crosspiece and two girders, surrounding a slab in transparent material; the upper crosspiece and the girders of the fore element being equipped with joint elements and at least a gasket on edges turned towards a back part of a vehicle when mounted on a vehicle bed; wherein on a free end of each of the girders of the fore element a moving element is placed, sliding in one of the rails;
    the back element of the shell being a rigid frame, formed by an upper crosspiece and two girders, surrounding a slab in transparent material; the upper crosspiece and the girders of the back element being equipped with joint elements on edges turned towards a fore part of a vehicle when mounted on a vehicle bed; an element with no gearings is fixed on a free end of each of the girders of the frame of the back element, such element moving in one of the rails;
    each intermediate element being formed by at least three parts: an upper crosspiece and two girders; the upper crosspiece of each intermediate element being hinged to the girders through hinges; at least an elastic element and a gasket being further fixed between each girder and the upper crosspiece of each intermediate element; each intermediate element being foldable and the girders are placed under the upper crosspiece when the shell is not mounted; a moving element being placed on a free end of each end of the girders of each intermediate element said moving element sliding in one of the two rails; the intermediate elements being equipped with joint elements both on edges turned towards a back part of a vehicle when mounted on a vehicle and on edges turned towards a fore part of a vehicle when mounted on a vehicle and with a gasket on the edges turned towards a back part of a vehicle; the intermediate elements being equipped with openings closed by slabs in transparent material;
    each rail is adapted to be fixed to an upper edge of a side of a motor vehicle bed; in proximity of the fore part of each rail, a plaque is fixed; each plaque is equipped with threaded holes aimed at welcoming screws to stop the back element or the intermediate element next to the fore element.

2. Partially dismountable hard shell, in accordance with claim 1, characterized by the fact that the upper crosspiece and the girders of the fore element being also equipped with holding elements and the upper crosspiece and the girders of the back element being equipped with hook-up devices to the holding elements of the fore element.

3. Partially dismountable hard shell, in accordance with claim 2, characterized by the fact that the intermediate element next to the fore element being further equipped with hook-up devices to the holding elements of the fore element.

4. Partially dismountable hard shell, in accordance with claim 2, characterized by the fact that the intermediate element next to the back element being further equipped with holding elements for the hook-up devices of the back element.

5. Partially dismountable hard shell, in accordance with claim 1, characterized by the fact that at least a connection part is disposed between each girder and the upper crosspiece of each intermediate element; each connection part being hinged to the upper crosspiece through at least one hinge; at least an elastic element and a gasket being disposed between each connection part and the upper crosspiece; each connection part being hinged to a girder through at least one hinge; at least an elastic element and a gasket being disposed between each connection part and a girder; said intermediate elements being equipped with hook-up elements on the edges turned both towards a back part and a fore part of a vehicle when mounted to the vehicle bed; said intermediate elements being further equipped with a gasket on the edges turned towards a back part of a vehicle when mounted to the vehicle bed; each intermediate element is foldable and the girders and the connection parts being placed under the upper crosspiece when the shell is not mounted.

6. Partially dismountable hard shell, in accordance with claim 1, characterized by the fact that each rail comprises a first and a second U-shaped section bar, the first U-shaped section bar is placed after the second U-shaped section bar; the first and the second U-shaped section bar being coaxial; said first section bar being placed towards a fore part of a vehicle when mounted to the vehicle bed while said second section bar being placed in central and back parts of a vehicle when mounted to the vehicle bed.

7. Partially dismountable hard shell, in accordance with claim 1, characterized by the fact that the intermediate elements being self supporting when mounted.

8. Partially dismountable hard shell, in accordance with claim 1, characterized by the fact that all folded intermediate elements are lodged in a container adapted to be placed on a bed of the motor vehicle, separated with spacers in expandable polystyrene or in granules.

9. Partially dismountable hard shell, in accordance with claim 1, wherein the upper crosspiece and the girders of the fore element being also equipped with devices for hook-up with remaining elements and the upper crosspiece and the girders of the back element being also equipped with holding elements for the hook-up devices of the fore element.

10. Partially dismountable hard shell, in accordance with claim 9, wherein the intermediate element next to the fore element being further equipped with holding elements for the hook-up devices of the fore element and the intermediate element next to the back element being further equipped with hook-up devices to the holding elements of the back element.

11. Partially dismountable hard shell, in accordance with claim 6, wherein the first section bar is not equipped with gearings while the second section bar is equipped with gearings.

12. Partially dismountable hard shell, in accordance with claim 11, wherein the moving element placed on each free end of the girders of the fore element sliding in a rail is equipped with gearings and slides in said first section bar not equipped with gearings.

13. Partially dismountable hard shell, in accordance with claim 6, wherein the first section bar is equipped with gearings.

14. Partially dismountable hard shell, in accordance with claim 13, characterized by the fact that said moving element placed on each free end of the girders of the fore element sliding in a rail is not equipped with gearings and slides said first section bar equipped with gearings.

15. Partially dismountable hard shell, in accordance with claim 6, wherein the second section bar is not equipped with gearings.

16. A vehicle with a bed including a partially dismountable hard shell for the vehicle bed, comprising:
    a fore element permanently mounted on the bed;
    a back element permanently mounted on the bed;
    more than three intermediate elements detachable and foldable; and
    two rails fixed to side edges of the vehicle bed;
    wherein the fore element of the shell is a rigid frame, formed by an upper crosspiece and two girders, surrounding a slab in transparent material; the upper crosspiece and the girders of the fore element being equipped with joint elements and at least a gasket on edges turned towards a back part of the vehicle on a free end of each of the girders of the fore element a moving element is placed, sliding in one of the rails fixed to side edges of the motor vehicle bed;
    the back element of the shell being a rigid frame, formed by an upper crosspiece and two girders, surrounding a slab in transparent material; the upper crosspiece and the girders of the back element being equipped with joint elements on edges turned towards a fore part of the vehicle; an element with no gearings is fixed on a free end of each of the girders of the frame of the back element, such element moving in one of the rails;
    each intermediate element being formed by at least three parts: an upper crosspiece and two girders; the upper crosspiece of each intermediate element being hinged to the girders through hinges; at least an elastic element and a gasket being further fixed between each girder and the upper crosspiece of each intermediate element; each intermediate element being foldable and the girders are placed under the upper crosspiece when the shell is not mounted; a moving element being placed on a free end of each of the girders of each intermediate element said moving element sliding in one of the two rails; the intermediate elements being equipped with joint elements both on edges turned towards the back part and on edges turned towards the fore part of the vehicle and with a gasket on the edges turned towards the back part of the vehicle; the intermediate elements being equipped with openings closed by slabs in transparent material;
    each rail is fixed to an upper edge of a side of the motor vehicle bed; in proximity of the fore part of each rail, a plaque is fixed; each plaque is equipped with threaded holes aimed at welcoming screws to stop the back element or the intermediate element next to the fore element.

* * * * *